(12) United States Patent
Rosa et al.

(10) Patent No.: US 11,165,679 B2
(45) Date of Patent: Nov. 2, 2021

(54) ESTABLISHING CONSUMED RESOURCE TO CONSUMER RELATIONSHIPS IN COMPUTER SERVERS USING MICRO-TREND TECHNOLOGY

(71) Applicant: INTERNATIONAL BUSINESS MACHINES CORPORATION, Armonk, NY (US)

(72) Inventors: Daniel Rosa, Highland, NY (US); Donald Schmidt, Stone Ridge, NY (US); Nicholas R. Jones, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 16/407,634

(22) Filed: May 9, 2019

(65) Prior Publication Data
US 2020/0358682 A1 Nov. 12, 2020

(51) Int. Cl.
*G06N 20/00* (2019.01)
*H04L 12/26* (2006.01)

(52) U.S. Cl.
CPC ......... *H04L 43/0817* (2013.01); *G06N 20/00* (2019.01); *H04L 43/062* (2013.01);
(Continued)

(58) Field of Classification Search
CPC ... H04L 43/067; H04L 43/08; H04L 43/0876; H04L 43/16; H04L 67/1008;
(Continued)

(56) References Cited

U.S. PATENT DOCUMENTS

| 6,738,933 B2 | 5/2004 | Fraenkel et al. |
| 7,065,624 B1 | 6/2006 | Zahavi |

(Continued)

OTHER PUBLICATIONS

Allen B. Downey and Dror G. Feitelson, "The elusive goal of workload characterization," SIGMETRICS Performance Evaluation Rev. 26, 4 (Mar. 1999), 14-29.
(Continued)

*Primary Examiner* — Emmanuel L Moise
*Assistant Examiner* — Xiang Yu
(74) *Attorney, Agent, or Firm* — Cantor Colburn LLP; Teddi Maranzano

(57) ABSTRACT

A computer-implemented method for diagnosing workload performance problems in computer servers includes measuring resource metrics. The method further includes aggregating resource metrics for each consumed resource, and aggregating resource and non-resource activity metrics for each consumer. The method further includes generating condensed diagnostic data, on a synchronized, regular interval with one or more most significant consumed resource names and corresponding consumed resource metrics. Generating the condensed diagnostic data includes grouping consumers into buckets based on bucket and consumer attributes, aggregating resource and non-resource consumer activity metrics across all consumers in each bucket, and including one or more worst offending consumer names with corresponding resource and non-resource consumer activity metrics in each bucket. The condensed diagnostic data with the most significant consumed resources and bucket contents is recorded. Diagnostic data can be generated in a human consumable form or in a machine consumable form for using machine learning.

18 Claims, 5 Drawing Sheets

(52) U.S. Cl.
CPC .......... *H04L 43/065* (2013.01); *H04L 43/067* (2013.01); *H04L 43/0876* (2013.01); *H04L 43/16* (2013.01)

(58) Field of Classification Search
CPC ............. H04L 43/0817; G06F 11/3433; G06F 11/3442; G06F 9/4881; G06F 9/50; G06F 9/505; G06N 20/00
See application file for complete search history.

(56) References Cited

U.S. PATENT DOCUMENTS

| | | | |
|---|---|---|---|
| 7,752,013 | B1 | 7/2010 | Broyles |
| 7,865,958 | B2 | 1/2011 | Lieblich et al. |
| 8,312,465 | B2 | 11/2012 | Pierce et al. |
| 8,566,956 | B2 | 10/2013 | Slater |
| 9,224,168 | B2 | 12/2015 | Thirumalai et al. |
| 9,823,994 | B2 | 11/2017 | Altman et al. |
| 2005/0015744 | A1 | 1/2005 | Bushey |
| 2011/0252143 | A1* | 10/2011 | Baumback ........ H04L 29/08198 709/226 |
| 2013/0158950 | A1 | 6/2013 | Cohen et al. |
| 2014/0047096 | A1* | 2/2014 | Kupershmidt .......... G06F 11/34 709/224 |
| 2015/0365309 | A1 | 12/2015 | Kaminski |
| 2016/0277511 | A1* | 9/2016 | Fang ..................... H04L 67/16 |
| 2017/0206462 | A1 | 7/2017 | Arndt et al. |
| 2018/0143852 | A1* | 5/2018 | Ballantyne ............ G06F 9/4881 |
| 2018/0196727 | A1 | 7/2018 | Giamei et al. |
| 2019/0129779 | A1 | 5/2019 | Adamson |
| 2020/0051104 | A1* | 2/2020 | Dravneek .............. G06Q 40/02 |

OTHER PUBLICATIONS

Allen D. Malony and Daniel A. Reed, "A hardware-based performance monitor for the Intel iPSC/2 hypercube," Proceedings of the 4th international conference on Supercomputing (ICS '90). ACM, New York, NY, USA, 213-226.

Dror G. Feitelson, "Locality of sampling and diversity in parallel system workloads," Proceedings of the 21st annual international conference on Supercomputing (ICS '07). ACM, New York, NY, USA, 53-63.

H. Malik, I. J. Davis, M. W. Godfrey, D. Neuse and S. Mankovskii, "Detecting Discontinuities in Large Scale Systems," 2014 IEEE/ACM 7th International Conference on Utility and Cloud Computing, London, 2014, pp. 345-354.

T. Malik, and R. Burns, "Workload-Aware histograms for remote applications," In International Conference on Data Warehousing and Knowledge Discovery, pp. 402-412. Springer, Berlin, Heidelberg, 2008.

X. Zhang, F. Meng, P. Chen and J. Xu, "TaskInsight: A Fine-Grained Performance Anomaly Detection and Problem Locating System," 2016 IEEE 9th International Conference on Cloud Computing (CLOUD), San Francisco, CA, 2016, pp. 917-920.

List of IBM Patents or Patent Applications Treated as Related; Date Filed: May 9, 2019, 2 pages.

Rosa et al., "Diagnosing Workload Performance Problems in Computer Servers," U.S. Appl. No. 16/407,628, filed May 9, 2019.

* cited by examiner

ESTABLISHING CONSUMED RESOURCE TO CONSUMER RELATIONSHIPS IN COMPUTER SERVERS USING MICRO-TREND TECHNOLOGY

BACKGROUND

The present invention relates to computer servers, and particularly to diagnosing workload performance problems in computer servers by generating high frequency micro-trends.

Operating systems (e.g. z/OS) provide controls to share finite hardware resources amongst client services. A workload consists of 1 or more jobs performing computing for similar client services. When multiple workloads are executing in parallel on the same operating system, a component (e.g. Workload Manager (WLM) on z/OS) provides controls to define attributes for each workload such as an importance level and a goal (e.g. response time). At regular intervals (e.g. every 10 s), this component assesses the results of each workload and may change the scheduler priority attribute of each workload so most important workloads achieve their goals. Work represents the aggregate computing performed across all workloads.

For images serving multiple (e.g. double digits) workloads, transient performance problem diagnosis requires identifying problematic workload(s), defining root cause, and recommending corrective action. A performance analyst uses visual analytics to graphically visualize activity in the form of metrics (e.g. central processing unit (CPU) execution time, CPU efficiency, CPU delay, serialization contention, etc.) against time for all work to define normal and anomalous activity. Detailed visual analytics against each workload can be overwhelming to an analyst and require significant computing resources.

SUMMARY

According to one or more embodiments, a computer-implemented method for diagnosing workload performance problems in computer servers includes measuring resource metrics, aggregating resource metrics for each consumed resource, and aggregating resource metrics for each consumer. The method further includes aggregating resource and non-resource low level metrics up to higher level constructs by generating diagnostic data, on a synchronized, regular interval. Generating diagnostic data includes identifying one or more most significant consumed resource name(s) and corresponding resource metrics, grouping consumers into buckets based on bucket and consumer attributes, and aggregating resource and non-resource consumer activity metrics across all consumers in each bucket. Generating the diagnostic data further includes one or more worst offending consumer name(s) with corresponding resource and non-resource activity metrics in each bucket. The method further includes recording the most significant consumed resource(s) and bucket contents. The method includes generating high level, condensed diagnostic data at a high frequency, human consumable analysis interval and analyzing recorded bucket contents, to determine a base-line and base-line deviation periods, identify a peak or valley for every base-line deviation, and temporally correlate peaks and valleys to map relationships between consumed resources, worst offending consumers, and bucket consumers. This method also includes generating high level, condensed diagnostic data at a higher frequency, machine analysis interval to train a machine learning model with lower data generation and model training costs while maintaining model accuracy and to score with a machine learning model. The method further includes mapping, on an analysis interval, a consumed resource to a consumer by identifying and correlating micro-trends from the recorded data.

According to one or more embodiments, a computer program product includes measuring resource metrics, aggregating resource metrics for each consumed resource, and aggregating resource metrics for each consumer. The method further includes aggregating resource and non-resource low level metrics up to higher level constructs by generating diagnostic data, on a synchronized, regular interval. Generating diagnostic data includes identifying one or more most significant consumed resource name(s) and corresponding resource metrics, grouping consumers into buckets based on bucket and consumer attributes, and aggregating resource and non-resource consumer activity metrics across all consumers in each bucket. Generating the diagnostic data further includes one or more worst offending consumer name(s) with corresponding resource and non-resource activity metrics in each bucket. The method further includes recording the most significant consumed resource(s) and bucket contents. The method includes generating high level, condensed diagnostic data at a high frequency, human consumable analysis interval and analyzing recorded bucket contents, to determine a base-line and base-line deviation periods, identify a peak or valley for every base-line deviation, and temporally correlate peaks and valleys to map relationships between consumed resources, worst offending consumers, and bucket consumers. This method also includes generating high level, condensed diagnostic data at a higher frequency, machine analysis interval to train a machine learning model with lower data generation and model training costs while maintaining model accuracy and to score with a machine learning model. The method further includes mapping, on an analysis interval, a consumed resource to a consumer by identifying and correlating micro-trends from the recorded data.

According to one or more embodiments, a system includes a memory, and a processor coupled to the memory, the processor performs a method of diagnosing workload performance problems in the system. The method includes measuring resource metrics, aggregating resource metrics for each consumed resource, and aggregating resource metrics for each consumer. The method further includes aggregating resource and non-resource low level metrics up to higher level constructs by generating diagnostic data, on a synchronized, regular interval. Generating diagnostic data includes identifying one or more most significant consumed resource name(s) and corresponding resource metrics, grouping consumers into buckets based on bucket and consumer attributes, and aggregating resource and non-resource consumer activity metrics across all consumers in each bucket. Generating the diagnostic data further includes one or more worst offending consumer name(s) with corresponding resource and non-resource activity metrics in each bucket. The method further includes recording the most significant consumed resource(s) and bucket contents. The method includes generating high level, condensed diagnostic data at a high frequency, human consumable analysis interval and analyzing recorded bucket contents, to determine a base-line and base-line deviation periods, identify a peak or valley for every base-line deviation, and temporally correlate peaks and valleys to map relationships between consumed resources, worst offending consumers, and bucket consumers. This method also includes generating high level, condensed diagnostic data at a higher frequency, machine analysis interval to train a machine learning model with lower data generation and model training costs while maintaining model accuracy and to score with a machine learning model. The method further includes mapping, on an analysis interval, a consumed resource to a consumer by identifying and correlating micro-trends from the recorded data.

Embodiments of the present invention further include a system and computer program product each configured to perform the method described above.

DETAILED DESCRIPTION

Figure 1:
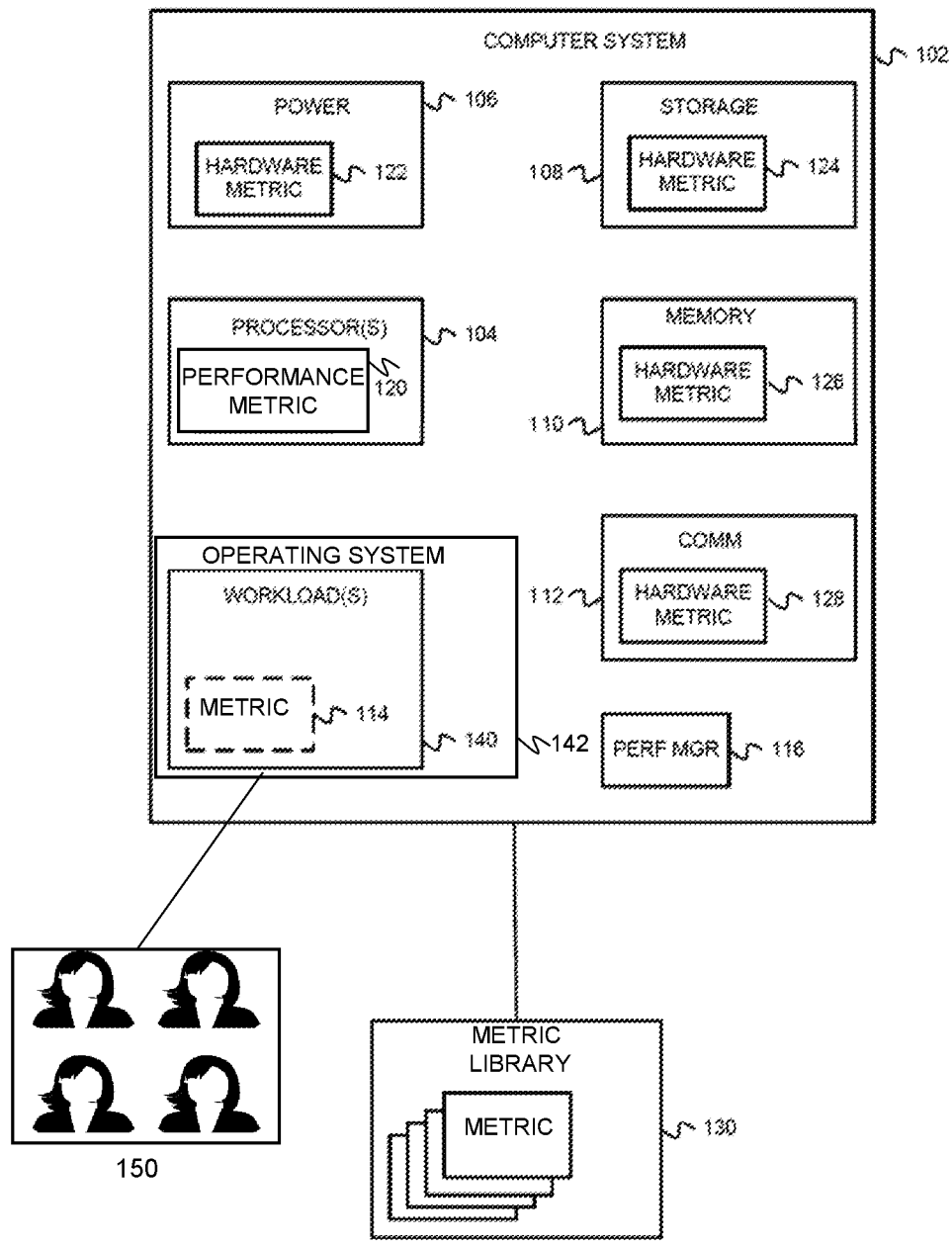
FIG. 1 depicts a block diagram of a system that collects resource and activity metrics to create micro-trends according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Assessing performance of workloads on computing systems can be an important part of the testing and day-to-day operation of workloads. Traditionally such assessments are accomplished through workload performance instrumentation that includes a workload and component summary collected at a long interval (e.g. 15 minutes). Performance analysts begin with assessing the overall workload and component summary. When the overall results are unexpected, a performance problem occurred during most of the long interval (e.g. the problem occurred for 10 out of 15 minutes) and the analyst knows which components require further investigation. When the overall results look good, there can be transient performance problems occurring for a small part of the interval (e.g. 3 minutes) that go unnoticed because they are lost in averages across the interval. For example, 90% CPU utilization for the long interval (e.g. 15 minutes) can be achieved through the workload consistently running at 90% CPU utilization or the workload having periods at 70% CPU utilization and other periods at 100% CPU utilization. Using existing techniques, performance analysts cannot see the difference. Gathering the workload and component summary has high compute costs at interval end, so collecting the data at a shorter interval (e.g. 1 minute) can incur unacceptable compute costs and in some situations distort the underlying performance.

A computer server ("server") makes finite hardware resources available to multiple applications. The server consists of many stack layers (e.g. middleware, operating system, hypervisor, and hardware). Every stack layer contains components (single to double digits) that manage resources (single digits to thousands) that are virtualized to the applications, and consequently to the users of those applications. The workload consists of stack layers, components, and user requests. The workload context consists of component activities and resources and their interdependencies and interactions. As the arrival pattern changes, the workload context changes.

A workload performance problem typically describes a problem symptom like a slow/erratic response time or high resource contention. The overall workload and component summary are investigated and the problem is sent to the component that is most likely the problem source for further diagnosis. A component expert generally begins with first failure data capture that includes a multi-minute (e.g. 15 minutes) component summary of activity (e.g. requests, response times) to identify normal and anomalous results. If no anomalous results are found, the component is not obviously involved and the problem is sent to a different component expert. When an individual component discovers anomalous results or all components have no anomalous results in the summary, component details (e.g. all component activity records) must be investigated. Each component has its own controls to capture component details due to high CPU overheads associated with collecting component details. Collecting component details requires recreating the problem. If the component details across all suspected components do not contain information about the anomalous results, new traces and diagnostics must be pursued. With the necessary component details, an expert will be able to define the problem or route the problem to another expert to investigate further. Recreating the problem to collect new data, transform data, analyze data, engage new experts, collect additional data, and correlate data across components increases the time required to define the workload context and ultimately define the underlying problem.

With existing technologies, an advanced performance analyst can apply machine learning to build a model using detailed training data. Machine learning training requires significant compute and memory resources to transform data, identify and consider important data, and ignore noise. With a model in place, test data can be scored to detect and correlate anomalies. An advanced performance analyst then defines a problem that fits the anomalies from machine learning. A problem definition enables a performance analyst to take action against a workload component or resource to address the problem.

With existing technologies, workload components cannot produce high-frequency, summary data for an acceptable CPU cost with current support and procedures. Using existing techniques, workload components can collect summary data for long intervals (e.g. 15 minutes) at an acceptable compute CPU cost. Summary data cannot be collected at a short interval (e.g. less than 1 minute) because of the unacceptable increase in CPU cost and can distort the problem. With existing techniques, workload component details can be collected for specific problems, but incur unacceptable CPU cost when regularly collected.

The present invention provides an orthogonal approach to generate synchronized, standardized, and summarized data for immediate analysis. This smarter data can be collected at a human consumable high frequency (e.g. greater than one second) for an undetectable CPU cost. A light-weight analytics engine can transform this smarter data into component activity and resource micro-trends and correlate micro-trends to reveal workload component activity and resource interdependencies and interactions with cause and victim peers. The whole process from the smarter data generation to the analysis focuses on summarizing data and thereby reducing noise, which enables an analyst to quickly turn data into insights.

Embodiments of the present invention facilitate diagnosing workload performance problems by collecting activity (e.g. CPU execution time) at a human consumable high frequency (e.g. greater than one second), establishing the activity normal base-line (e.g. mean), identifying base-line deviations (e.g. deviating 10% above or below the base-line), and temporally correlating base-line deviations. A micro-trend is a short-duration (e.g. one or more high frequency intervals) deviation from the base-line. Further, every micro-trend contains a peak for every base-line deviation period above the base-line or a valley for every base-line period below the base-line. Micro-trend peak and valley correlations are used to identify cause-and-effect peers amongst component activities and resources across the stack.

One or more embodiments of the present invention addresses technical challenges and facilitate an analyst to quickly investigate component data to identify normal and anomalous activity and determine the workload context. Accordingly, one or more embodiments of the present invention facilitate decreasing the time required to determine the involved components, their interdependencies, their interactions, and how they are being affected by the underlying performance problem. One or more embodiments of the present invention are rooted in computing technology, particularly diagnosing workload performance problems in computer servers. Further, the one or more embodiments of the present invention improves existing solutions to the technical challenge in computing technology by significantly reducing the time required to identify normal and anomalous activity and determine the workload context.

Embodiments of the present invention facilitate diagnosing workload performance problems by using time synchronized cross-stack micro-trend data generation.

Performance problems do not occur in a vacuum. Their ripple effects permeate through the workload. One or more embodiments of the present invention use such component ripple effects to detect clues to defining the underlying problem. Component ripple effects can have short or long durations with impacts ranging from none, to subtle, to significant. Detecting such component ripples requires high frequency, synchronized, standardized, and summarized data generation. Accordingly, micro-trends make subtle component ripple effects for transient durations detectable, and hence can be used for diagnosing previously undetectable workload performance problems.

One or more embodiments of the present invention facilitate generating micro-trends with substantial reduction in the CPU costs. Using one or more embodiments of the present invention, because of low overhead, a server can aggregate always-on cross-stack high-frequency activity metrics that capture the arrival pattern effects on the workload context. An analytics engine transforms activity metrics into micro-trends. Correlating micro-trends casts a wide net to catch ripple effects across the entire workload and ensure performance first failure data capture is available whenever a performance problem is reported.

FIG. 1 depicts a block diagram of a system that collects metrics to create micro-trends according to one or more embodiments of the present invention. In some embodiments, system 100 includes a computer system 102, performance manager 116, and metric library 130. Computer system 102 may include processors 104, memory 110, and power subsystem 106, among other components. Computer system 102 may optionally include storage subsystem 108 and communication subsystem 112. The computer system 102 can run multiple operating systems 142 (e.g. z/OS) that run multiple workloads 140 (e.g. On-Line Transaction Processing [OLTP] and batch) to satisfy requests from multiple users 150. In some operating systems (e.g. z/OS), a user instance (150) is embodied in a job (e.g. a work unit for the operating system to complete).

Processors 104 may include one or more processors, including processors with multiple cores, multiple nodes, and/or processors that implement multi-threading. In some embodiments, processors 104 may include simultaneous multi-threaded processor cores. Processors 104 may maintain performance metrics 120 that may include various types of data that indicate or can be used to indicate various performance aspects of processors 104. Performance metrics 120 may include counters for various events that take place on the processors or on individual processor cores on a processor. For example, a processor may have architected registers that maintain counts of instructions, floating point operations, integer operations, on-processor cache hits and misses, pipeline stalls, bus delays etc. Additionally, time may be a performance metric. Registers or other data locations or functions that maintain a time value may be used as a performance metric 120 in some embodiments.

Memory 110 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). A memory controller for memory 110 may maintain performance metrics 126 that may include various types of data that indicate or can be used to derive indicators of memory performance. For example, memory performance metrics 126 may include counter for the number of memory accesses, type of accesses (e.g., read or write access), cache hits, cache misses etc.

Power subsystem 106 provides and regulates power to the various components of computer system 102. Power subsystem 106 may maintain performance metrics 122 that comprise voltage levels for various rails of one or more power supplies in power subsystem 106.

Storage subsystem 108, when present, provides persistent storage for computer system 102. Such storage can include hard disks, optical storage devices, magnetic storage devices, solid state drives, or any suitable combination of the foregoing. Storage subsystem 108 may maintain performance metrics 124 that may include counts of read or write accesses, or timing information related to reads, writes and seeks.

Communication subsystem 112, when present, provides network communication functions for computer system 102. Communication subsystem 112 may maintain performance metrics 128 that may include counts of packets transmitted and received and other data regarding network communications. In some embodiments, communication subsystem 112 may include a network interface (e.g., an ATM interface, an Ethernet interface, a Frame Relay interface, SONET interface, wireless interface, etc.)

The computer system 102 contains operating systems (142) that can be configured to process workloads 140. A workload 140 is a set of tasks interacting to complete requests from users 150. An operating system 142 maintains performance metrics 114 for each user about its activity (e.g. data size) and resource use and resource use (e.g. time using network adapter to send/receive packets In some embodiments, a performance manager 116 facilitates tracking performance metrics (e.g. read and write accesses from memory subsystem 126) and updating workload and user metrics. Different workloads may have different characteristics. For example, OLTP (On-Line Transaction Processing) workloads typically involve many data entry or retrieval requests that involve many short database interactions. Data mining workloads on the other hand have few interactions with users, but more complicated and lengthy database interactions. Different types of workloads 140 may have different impacts on the activities and resources of computer system 102.

In one or more embodiments of the present invention, a lightweight method includes an instruction sequence to aggregate the metrics described above is used during mainline operation of the workload. In one or more examples, the lightweight method is always running during mainline processing to aggregate metrics about computer system resource 102 use and the workload activity 140.

The performance manager 116 calculates metric deltas from the components of the computer system 102 including the workload 140 at periodic synchronized intervals. The periodic synchronized interval is at a human consumable high frequency that is greater than one second. The metrics for each component are generated in a continuous and always-on manner as described herein. In one or more embodiments of the present invention an administrator can switch off the data generation via the performance manager 116. Data generation is based on a synchronized interval across the whole computer system 102. Once different component metrics are using different intervals, correlations are much less viable. Consequently, the metric deltas are computed at the synchronized human consumable high frequency interval (e.g. greater than one second) across all components.

The metric library 130 represents the collection of metrics 120, 122, 124, 126, 128 that the performance manager 116 produced across all aspects of the computer system 102. The metric library 130 may be part of computer system 102, or it may be maintained on a separate system that is available to the computer system 102.

In some embodiments, the metrics aggregated and captured are customized for a particular hardware implementation and/or for particular type of workload 140. For example, for a particular workload 140, the metrics that are aggregated and captured only includes hardware metrics 120 for the used family of processors and memory subsystems.

The performance manager 116 further transforms the captured metrics into concise summaries using multiple levels of aggregation. Every aggregation level removes one or more details and further refines the data. The last aggregation level yields the context-rich and concise data required for micro-trends that can be used by an expert to define previously unseen workload performance problems.

Figure 2:
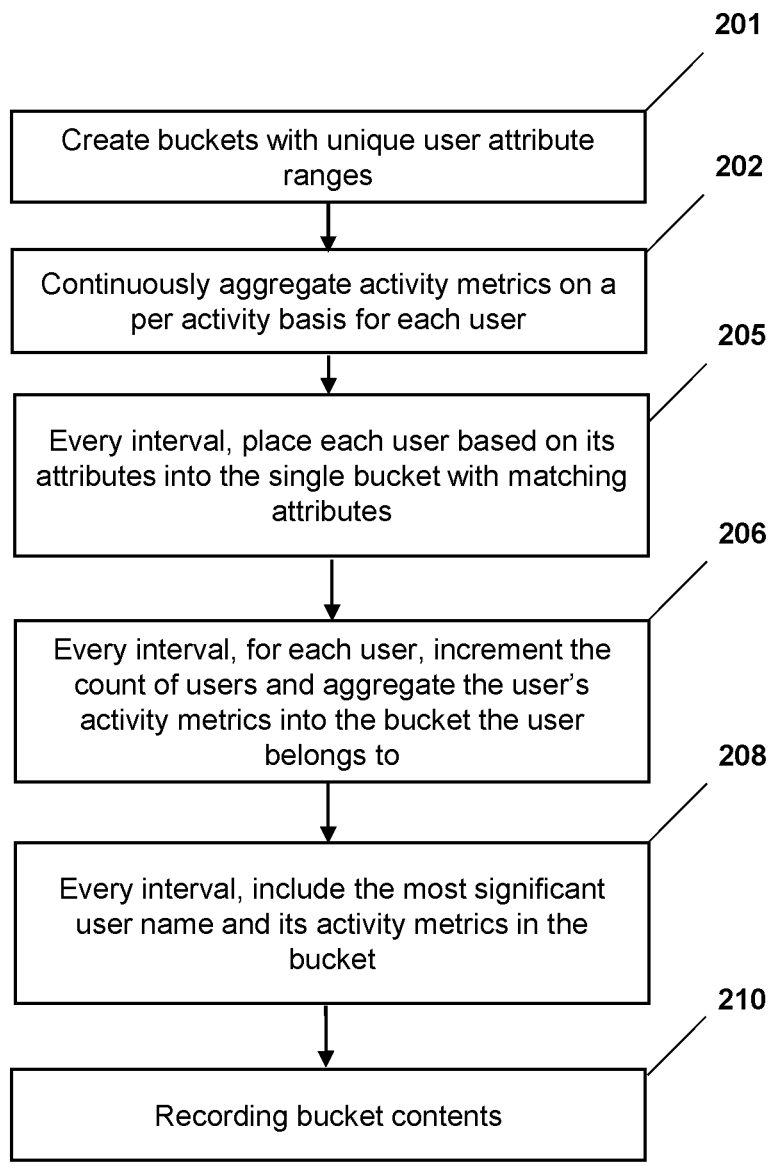
FIG. 2 depicts a flowchart for aggregating, grouping, and summarizing user activity to generate human consumable high frequency, concise, and context-rich data for micro-trends according to one or more embodiments of the present invention.

FIG. 2 depicts a flowchart for aggregating, grouping, and summarizing metrics to generate human consumable high frequency, concise, and context-rich data for micro-trends according to one or more embodiments of the present invention. To summarize similar users 150, every stack layer creates a small number of buckets (e.g. less than 30) with unique user attribute ranges (201) to standardize how each layer distributes its users 150 across buckets. For example, the operating system layer can choose the number of buckets based on four user priority attributes (e.g. critical, high, low, discretionary) and four user size attributes (e.g. large, medium, small, tiny) which yields 16 buckets (e.g. critical+large, critical+medium, discretionary+small, discretionary+tiny). Similarly, the hypervisor layer can choose a number of buckets based on its users (e.g. operating systems) size (e.g. large, medium, small, tiny) and type (e.g. z/OS, z/TPF, z/Linux, z/VM, etc.). It is understood that the above are examples of dividing the users 150 into buckets, and that one or more embodiments of the present invention can use different bucket attributes and values and ranges to achieve the same effect. Furthermore, every component inherits buckets and bucket attribute ranges from its stack layer. For example, the scheduler component of the operating system 142 inherits its buckets from the operating system 142 (e.g. critical+large, critical+medium, discretionary+small, discretionary+tiny) and their attribute ranges. In another example, the scheduler component of the hypervisor inherits the hypervisor buckets and attribute ranges (e.g. large+z/OS, medium+z/OS tiny+z/Linux, tiny+z/VM).

Next, every component continuously aggregates activity metrics (e.g. number of requests, response times) on a per activity basis for each user 150 (202). This is the first level of aggregation. For example, the performance manager 116 aggregates CPU activity metrics (e.g. CPU requests [dispatches], CPU delay time, and CPU use time) from hardware metrics (120) and in some embodiments the operating system metrics (142). The operating system 142 or performance manager 116 aggregates the results locally for every user 150.

Consider a computer system that has 30 or more users 150. The CPU activity metrics for every user 150 can overwhelm a human expert that is investigating such activity. Moreover, in typical scenarios, the number of users is even larger (in hundreds, if not thousands). A context-rich and concise activity summary for buckets of users 150 with similar activity can facilitate the human expert to analyze the data and diagnose the workload problem more efficiently.

Then for every human consumable high frequency interval (e.g. greater than one second), the performance manager (116) places each user based on its attributes into the single bucket with matching attributes (205) and for each user, increment the count of users and aggregate the user's activity metrics into the bucket the user belongs to (206). During this second level of aggregation, the most significant user name and its activity metrics are included in the bucket (208). In this embodiment, there is a single most significant user name and activity metrics, but other embodiments may include multiple significant users (e.g. low single digits). In this embodiment, the performance manager 116 performs the actions required for block 206 and 208. As shown in block 210, the performance manager 116 then records bucket contents for analysis. In some embodiments, the performance manager 116 may output visual analytics to an operatively connected output device.

Grouping users into a small number of buckets and aggregating their activity into buckets enables performance analysts to quickly detect user activity changes across all users 150 in the bucket. Furthermore, with the most significant user and its corresponding activity in each bucket, performance analysts can quantify how much of the bucket activity changes were attributable to the most significant user 150. Performance analysts can use a most significant user to determine whether one or multiple user are driving the majority of the bucket activity changes. When multiple users are driving bucket activity changes, performance analysts know other users are causing smaller impacts.

Further, in the same interval, low level activities are generalized into higher level user constructs. For example, low level activity metrics are associated with a specific user (150) are generalized by aggregating them into a bucket (206). When there is no specific user (e.g. for operating system overhead), the activity metrics are associated with the operating system (142) which may be treated as a special user (150) in its own bucket or like a regular user (150) and aggregated into an existing bucket (206). In either case, the data aggregation is performed continuously.

Over multiple intervals, bucket activity metrics exhibit normal and anomalous periods. Bucket activity metrics enable establishing normal base-line periods and base-line deviation periods as anomalous for a group of similar users. A micro-trend is a short-duration (e.g. one or more high frequency intervals) deviation period from the base-line. Every micro-trend above the base-line has a peak (e.g. a maximum value) and every micro-trend below the base-line has a valley (e.g. a minimum value). When activity metric peaks or valleys occur in buckets across multiple components and users, those activities are correlated between cause and victim peers. Micro-trend correlations can reveal cross-stack cause-and-effect interdependencies and relationships between buckets, most significant users, and activities because the same synchronized cross-stack interval is used to accumulate activity metrics across all components in the stack For any component across the hardware or software, micro-trend data generation delivers cross-stack summary of vital statistics that identify the affected buckets, users, and activities of an ailing workload.

According to embodiments of the present invention, a performance analyst can much more quickly identify which workload component(s) and which user(s) are cause and victim peers in a transient performance problem.

One or more embodiments of the present invention measures per user activity metrics for one or more activities independently from other activities. Aggregating user activity metrics into buckets improves the efficiency an analyst can diagnose workload performance problems. For example, if a component provides multiple services, the above technique can be applied to track only the relevant metrics for a particular service (e.g. the number of times the service like allocate memory was called) for each user. As a second example, consider CPU use. The computer system 102 can have a lot of CPUs, but which CPU a user operation actually ran on really does not matter, what matters is the CPU time used. So above techniques facilitate to track the amount of CPU time used for each user. It is understood that CPU time (or processor usage, or processor time) is just one metric that can apply micro-trends. In a similar manner, and in conjunction, in one or more embodiments of the present invention, other metrics such as number of requests, response time, accesses, and others for a particular computing resource, can apply micro-trends.

Figure 3:
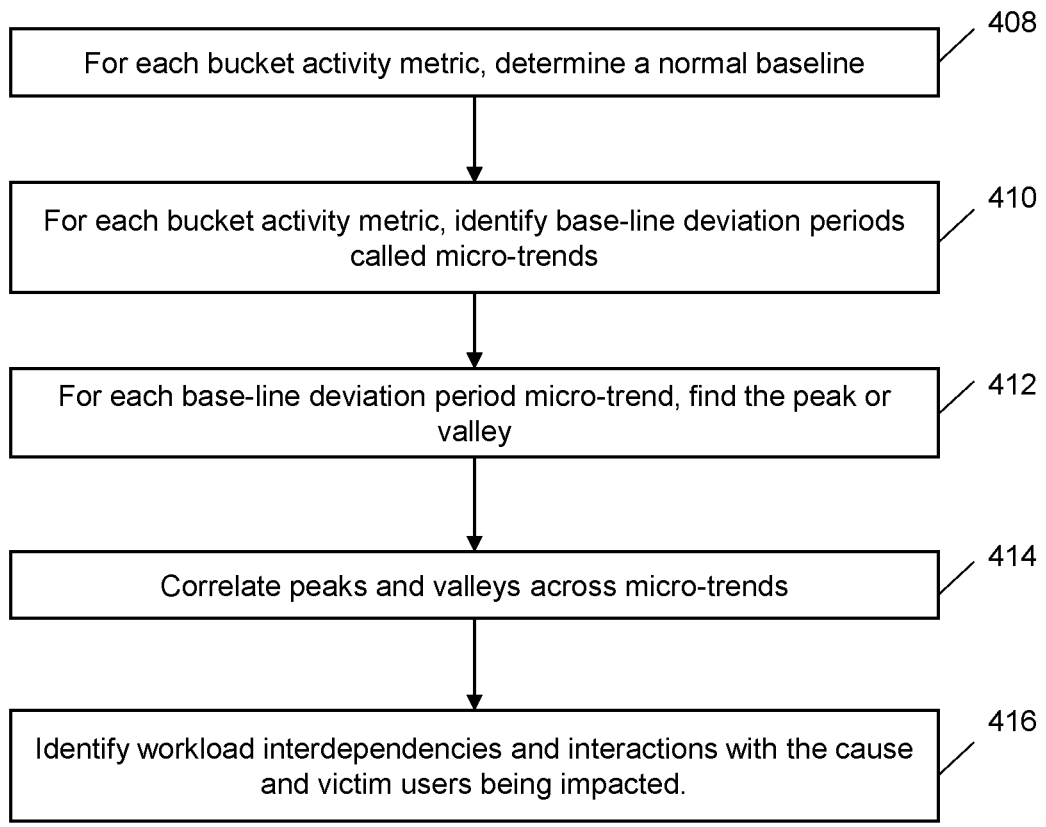
FIG. 3 depicts a flowchart of an example method for transforming human consumable high frequency, concise, and context-rich data into micro-trends and using micro-trends for workload diagnosis according to one or more embodiments of the present invention.

FIG. 3 depicts a flowchart of an example method for transforming human consumable high frequency, concise, and context-rich data into micro-trends and using micro-trends for workload diagnosis according to one or more embodiments of the present invention. The method includes using the performance manager 116 and metrics library 130, creating buckets with unique user attribute ranges (201), continuously aggregating activity metrics on per activity basis for each user (202), placing each user based on its user attributes into the bucket with matching attributes (205), aggregating user activity metrics into the single bucket with matching attributes (206), adding the most significant user name and its activity metrics into each bucket (208), and recording bucket contents (210). Once these human consumable high frequency (e.g. greater than one seconds) metrics are recorded, they are available for micro-trend analysis.

Further, the method includes determining a normal baseline for each bucket metric at block 408. For example, 15 consecutive minutes comprising high frequency intervals are analyzed to determine a normal baseline for each bucket metric (e.g. mean). Because the buckets are user attribute (e.g. priority and size) based, the bucket base-line represents the baseline of the all users in each bucket. Then for every bucket metric, an analyst can identify base-line deviation periods (e.g. 1 or more consecutive intervals deviating by at least a standardized threshold such as 10% above or below the normal base-line) called micro-trends as shown in block 410. In a bucket, a single user or multiple users behaving differently can cause a micro-trend for the bucket. For every micro-trend (base-line deviation period), the analyst locates a single point peak or valley in block 412 and correlates peak and valleys across micro-trends in block 414. Peak and valley micro-trend correlation locates other micro-trends experiencing peaks and valleys at the same time. For each micro-trend peak and valley, an analyst can identify workload interdependencies and interactions with cause and victim users being impacted at the time of the problem in block 416.

With micro-trends, a performance analyst can identify a set of users, workloads, and activities across the stack that are impacted during base-line deviation periods. With the impacted set of users, workloads, and activities, a performance analyst can focus on a deeper analysis of the impacted areas and ignore the unimpacted areas. Micro-trends improve the productivity of performance analysts greatly.

In one or more examples, the performance manager 116 may act based on micro-trends such as allocating computer resources from the system 102 in a different manner to avoid anomalies for a single user or bucket of users. For example, subsequent similar workload requests from that user may receive additional computer resources, such as memory, processor time, and the like. The performance manager 116 may act using a micro-trend feedback loop to access the action taken.

In other examples, when resource use for a single user or a bucket of users has micro-trends deviating from the baseline, the performance manager 116 can request the system 102 to allocate the resources in a different manner, particularly for users 150 identified to cause the anomaly in performance.

Accordingly, human consumable high frequency (e.g. greater than one second) data generation of micro-trends that include context-rich and concise activity metrics (e.g. requests, response times) over multiple intervals, exhibit patterns, which in turn can be used to identify workload performance problem(s) and particularly, as described above, specific user attributes, specific workloads, or specific activities and resources impacting and/or contributing to a performance problem. Micro-trends are base-line deviation periods. For each micro-trend, activity metric peaks and valleys focus performance analysts on which components, activities, and resources are significant factors in the ailing workload.

Figure 4:
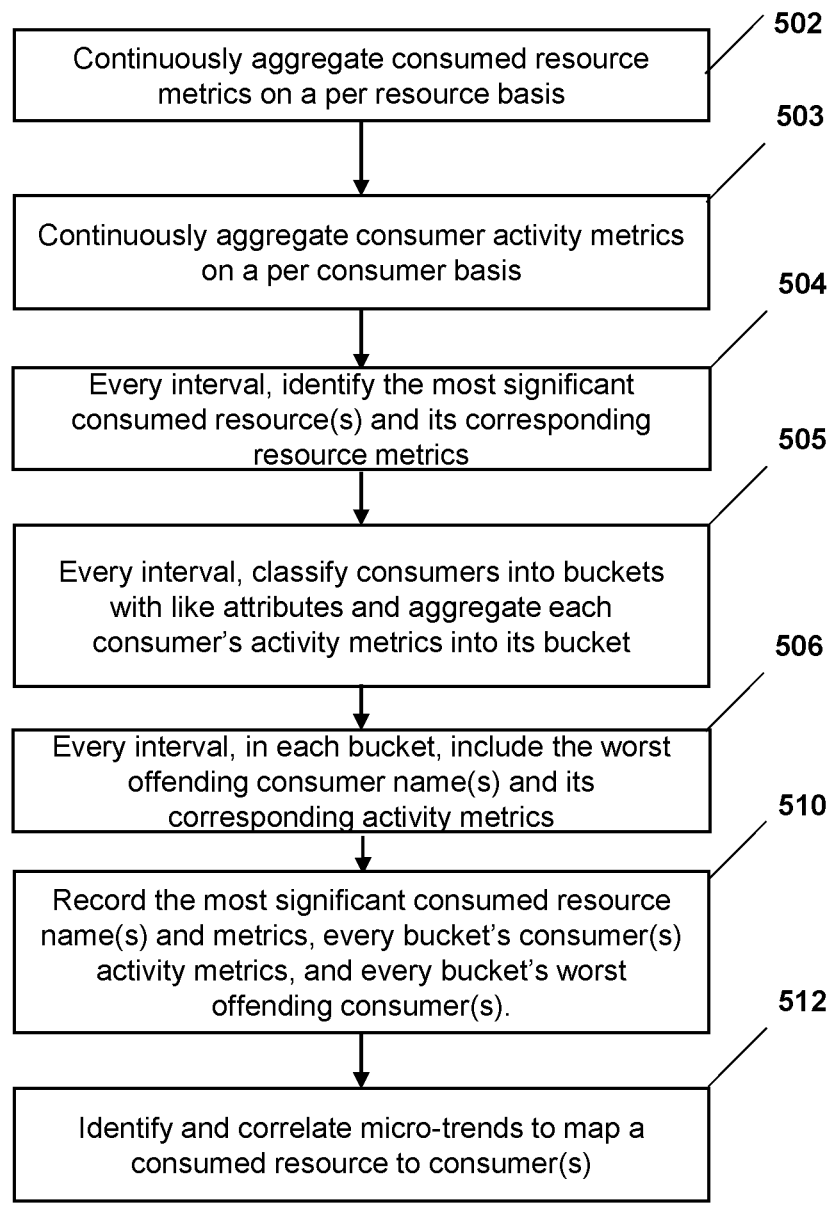
FIG. 4 depicts a flowchart for an example method for collecting metrics, generating data, and transforming data into micro-trends for establishing consumed resource to consumer relationships according to one or more embodiments of the present invention.

FIG. 4 illustrates an example method to use micro-trends to determine the consumed resource (e.g. which specific resource and what were its consumption metrics) and the consumer (e.g. which user 150 and what were its activity metrics) causing base-line deviations. The embodiment thus far requires instrumenting every consumed resource for every consumer (e.g. [consumed resources]*[consumers]). For many consumed resources (e.g. 100) and many consumers (e.g. 600), every consumed resource to consumer combination (e.g. 100*600=60,000) would have to be instrumented. This approach does not scale well for many consumed resources and many consumers. Instrumenting every consumed resource and consumer combination incurs high CPU and memory cost to collect, aggregate, and record the data. Furthermore, an analyst experiences data overload from analyzing a large data set of every consumed resource to consumer combination (e.g. 100*600=60,000). An analyst must find needles in a haystack because few combinations are of interest.

FIG. 4 depicts a flowchart for an example method for collecting metrics, generating data, and transforming data into micro-trends that reveals consumed resource to consumer relationships according to one or more embodiments of the present invention. The consumed resource to consumer combination of interest can be found quickly and more easily with smarter data collection and drawing conclusions from the collected data. First, continuously aggregate consumed resource metrics on a per resource basis (e.g. 100 consumed resource metrics) as shown in block 502. For example, after using a resource, aggregate the consumed resource metrics on a per resource basis. Next, continuously aggregate consumer activity metrics on a per consumer basis (e.g. 600 consumer activity metrics) as shown in block 503. For example, after using any resource (e.g. any of the 100 resources), aggregate the consumer activity metrics into the current consumer's activity metrics. Accordingly, one or more embodiments of the present invention facilitates providing smarter data collection that instruments significantly fewer resource activity metrics (e.g. 100+600=700 resource activity metrics which is significantly less than 100*600=60,000) which uses less CPU and memory than existing technologies.

In accordance with FIG. 4, at the end of every interval (e.g. greater than 1 second), identify the most significant consumed resource(s) and its corresponding resource activity metrics as shown in block 504. For example, one resource metric (e.g. largest aggregate time a resource was held) can determine the most significant consumed resource. Then, at the end of every interval, also classify consumers into buckets with like attributes and for each consumer, increment the count of consumers and aggregate the consumer's activity metrics into its bucket as shown in block 505. This results in each bucket containing the aggregate consumer activity metrics for all activity across all consumers in each bucket. While aggregating consumer activity every interval, also include the worst offending consumer name(s) and its corresponding activity in each bucket as shown in block 506. Similarly, one consumer activity metric (e.g. largest aggregate time a consumer held resources) can determine the worst offending consumer. Next, as shown in block 510, record the most significant consumed resource name(s) and activity metrics (results from block 504), every bucket's consumer activity metrics (results from block 505), and every bucket's worst offending consumer(s) and its corresponding activity metrics (results from block 506). Accordingly, one or more embodiments of the present invention significantly condenses the data recorded. This embodiment condenses the consumed resources significantly by only recording the most significant consumed resource(s) (e.g. only 1 out of 100 resource activity metrics are recorded). Furthermore, this embodiment condenses consumer resources significantly by recording fewer consumer resource activity instances per bucket such as bucket aggregate consumer activity and worst offending consumer(s) activity (e.g. for 16 buckets, only 32 consumer activity metrics are recorded). Further yet, the present invention focuses on recording summary data (bucket aggregate consumer(s) activity use) and exceptional data (most significant consumed resource(s) and worst offending consumer(s)). In addition, non-exceptional consumed resources are condensed and summarized into totals and averages. Furthermore, exceptional consumer activity entries which are condensed and summarized into buckets as totals, averages, and worst-offending consumer(s) with corresponding activity metrics. These design points reduce noise and ensures concise and context-rich data which lowers the CPU, memory, and storage costs.

Further, in conjunction, the method includes identifying and correlating micro-trends to map a consumed resource to consumer(s) at block 512 using techniques described herein (FIG. 3). The method further includes for the most significant consumed resource(s): determining a normal base-line via block 408, identifying base-line deviation periods called micro-trends via block 410, and determining the peak or valley for every deviation period via block 412. This method further includes reapplying the same procedure (e.g. block 408, 410, and 412) to the bucket aggregate consumer and worst offending consumer(s). Next, correlate consumed resource peaks to consumer activity peaks to map a consumed resource to a consumer. In many cases, a consumed resource peak is correlated with a bucket aggregate consumer peak which is correlated with a worst offending consumer peak. In many cases, the worst offending consumer is causing the bucket aggregate consumer peak and the consumed resource peak. Using this invention, an analyst can use micro-trend correlation to map causing consumers to effected consumed resources. Accordingly, one or more embodiments of the present invention facilitate adding both, the most significant consumed resource and worst offending consumer to the data generation for micro-trend. Such data generation enables micro-trends to identify the specific consumed resource and specific consumer deviating from the base-line at significantly lower compute and analysis cost.

Accordingly, one or more embodiments of the present invention are rooted in computing technology, particularly defining a workload performance problem in a computing system where a consumed resource to consumer combination is a significant contributor to the problem. One or more embodiments of the present invention further improve existing solutions in this regard by improving performance and by reducing CPU cost (CPU usage), amount of data instrumented, stored, and further analyzed. In turn, the workload performance problem can be diagnosed faster compared to existing solutions.

One or more embodiments of the present invention provide such advantages through micro-trend correlation that maps consumed resource peaks to worst offending consumer activity peaks to reveal which resources are being heavily used and which consumers are driving the usage. The worst offending consumer can be a bucket (e.g. a collection of consumers) or the single worst offending consumer in the bucket. Now, a performance analyst has first failure data capture that can detect transient differences in consumed resource use and worst offending consumers between base-line and base-line deviation periods. In this manner, the performance analyst receives the right data to discover consumed resource to consumer relationships and at significantly lower costs to CPU, memory, and disk.

With every component in the system 102 recording the results as noted above, any component across the hardware or software stack can generate context-rich and concise data and use micro-trends to facilitate finding consumed resource to consumer relationships across the stack.

Accordingly, one or more embodiments of the present invention facilitate time synchronized, high-frequency, cross-stack data generation required to create micro-trends. Micro-trends facilitate an analyst to quickly investigate component data to identify normal and anomalous activity and determine the workload context, and in turn significantly decreasing the time required to define a performance problem.

Smarter data generation facilitates detecting ripple effects in component performance by facilitating determination of the component base-line and uncovering base-line deviations called micro-trends. Micro-trends reveal never before seen component ripple effects. Micro-trends emerge from generating context-rich, low overhead, and concise component activity records on a human consumable, high frequency, synchronized interval (e.g. 5 greater than one second). Smarter data generation yields key component vital signs that enable establishing the component normal base-line and identifying base-line deviation periods called micro-trends (e.g. 1 or more sequential high frequency intervals deviating 10% above or below the base-line). Every micro-trend contains a peak or valley representing the interval deviating most from the base line. Micro-trend peak and valley correlations reveal cause-and-effect ripples across components and resources. Micro-trends make subtle component ripple effects for transient durations (e.g. greater than one second) detectable.

Further, low overheads in accumulating and collecting the metrics used for micro-trend data generation facilitates generating synchronized always-on cross-stack micro-trends that capture the arrival pattern effects on the workload context. Always-on micro-trends cast a wide net to catch ripple effects across the entire workload. They ensure performance first failure data capture is available whenever a performance problem is detected.

Micro-trends lower the expertise needed to detect and diagnose performance impacts. With micro-trends, performance teams can detect cause-and-effect relationships between workload components. Micro-trends improve triage and define areas of focus by exonerating unaffected components and resources, implicating the affected components and resources, and engaging the right experts.

Further, system availability improves with micro-trends. Micro-trends provide insights into problem areas before the problem causes outages. Experts can recommend configuration and/or tuning changes so that the system operation can be stabilized and the workload performance problem mitigated. An analyst can use micro-trends to assess whether an implemented configuration and/or tuning change had the intended effect without unintended consequences.

Further, micro-trends further improve solution quality because they provide a continuous feedback loop. For example, development teams can use micro-trends to make better design decisions and receive timely feedback by measuring the impacts within and across components. Development teams can foster performance improving conditions and avoid performance degrading conditions. Further yet, test teams can use micro-trends to validate that an intended scenario was driven and measure the desired results were achieved. Micro-trends also improve automation. As described herein, systems can perform automatic tuning or configuring based on micro-trends. Further yet, in one or more examples, the system or an analyst can use micro-trends to assess whether a configuration change was a step in the right direction to commit, or a step in the wrong direction to undo.

Further, one or more embodiments of the present invention facilitate generating smarter data input to reduce the cost and improve the speed of machine learning. Machine learning builds a model that represents input training data. Building a model requires cleansing and evaluating the training data to consider the relevant data and ignore noise. Then, the resulting model scores input test data that has a mixture of normal and anomalous data. Comparing the model results with the expected test data results produces a model accuracy percent. With micro-trend data generation changes, higher frequency machine consumable, fine-grained micro-trends can reduce machine learning training and scoring costs while maintaining model accuracy. One or more embodiments of the present invention, accordingly, provide a practical application of generating micro-trend diagnostic data that can be used to build a machine learning model which can score traditional mainline data or other micro-trend diagnostic data.

Figure 5:
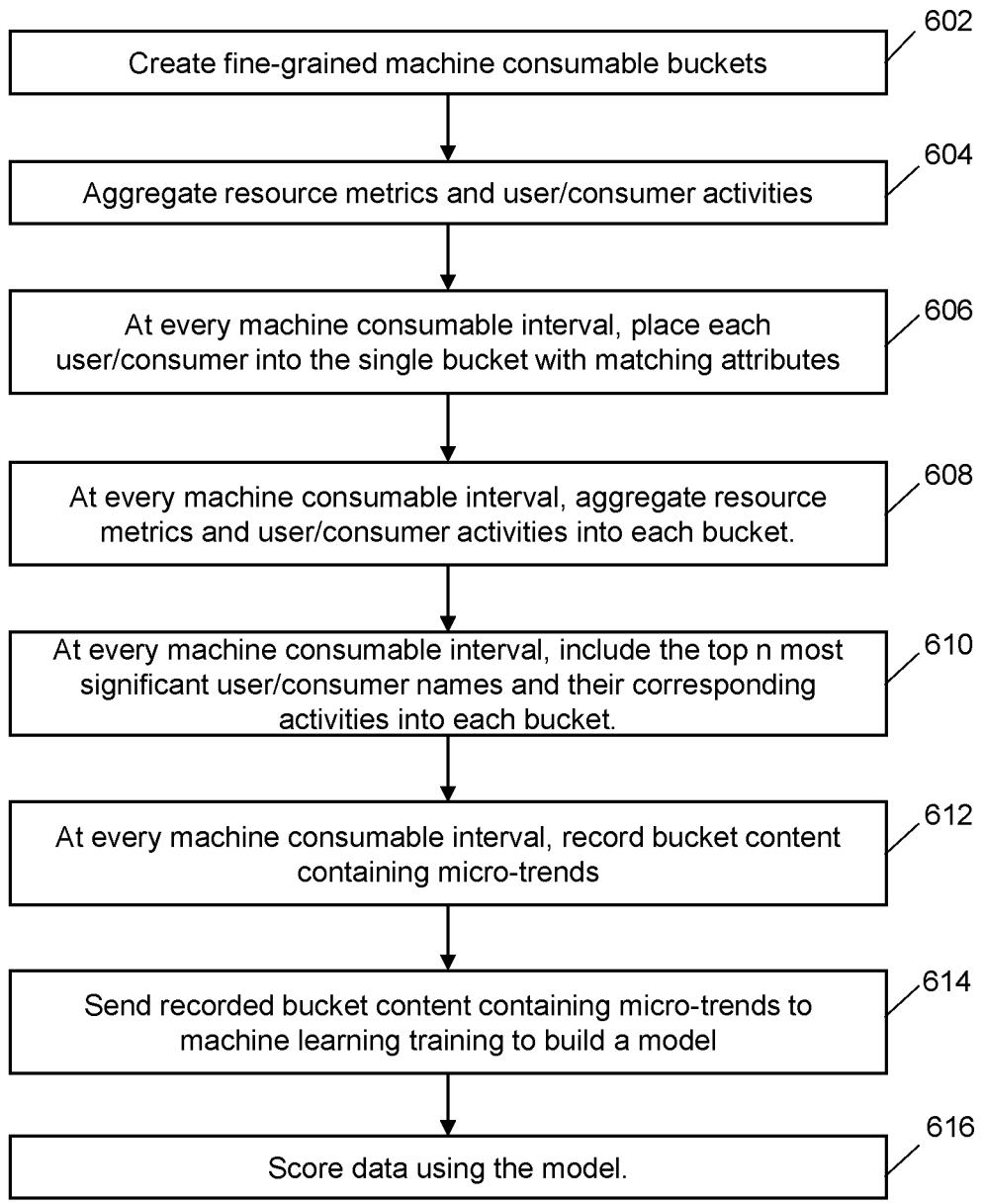
FIG. 5 depicts a flowchart of an example method to generate micro-trend data for machine learning according to one or more embodiments of the present invention.

FIG. 5 depicts a flowchart for an example method to generate micro-trend data for machine learning. First, in block 602, the method creates fine-grained machine consumable buckets which contains more buckets than human consumable micro-trend data generation. Next, in block 604, aggregate resource metrics like block 502 and user/consumer activities like blocks 202 and 503. Then in block 606, every interval machine consumable interval (e.g. less than one second which is not human consumable), each user/consumer is placed into the single bucket with matching attributes like 205 and 505. It should be noted that machine consumable interval and human consumable interval can be substantially different because of the rate at which humans can analyze the data compared to a machine (e.g. computer). It should be noted that the machine consumable interval is a higher frequency interval compared to a human consumable interval. Next, in block 608, on every machine consumable interval, resource metrics and user/consumer activity metrics are aggregated into buckets like blocks 206 and 505. Then in block 610, on every machine consumable interval, the top n most significant user/consumer names and their corresponding activities are included into each bucket. Then, in block 612, on every machine consumable interval, bucket content containing micro-trends are recorded like blocks 210 and 510. Next, bucket content containing micro-trends are sent to machine learning training to build a model in block 614. Then data is scored using the model as shown in block 616. Scoring can be done against machine consumable buckets containing micro-trends or traditional mainline data.

The machine consumable micro-trend data generation for machine learning builds on top of human consumable micro-trend data generation. Both generate synchronized, structured, context-rich data at an acceptable CPU cost. Human consumable micro-trend data generation has to avoid overwhelming or tiring the analyst, but that is not a concern for machine consumable micro-trend data generation. As a result, machine consumable micro-trend data generation collects additional buckets via new/additional bucket attributes (e.g. new z/OS job sizes of extra-large and extra-small) that distributes the workload across more buckets and yields fewer users/consumers in each bucket. Furthermore, with machine consumable micro-trend data generation, each bucket includes its non-exceptional users/consumers in the summary activity and captures its exceptional activity such as the top n most significant users/consumers. Also, machine consumable micro-trend data generation occurs more frequently than human consumable micro-trend data generation. Machine learning requires higher frequency and fine-grained micro-trend data generation to build a representative model while maintaining model accuracy.

The cost effectiveness and speed of machine learning training improves with machine consumable micro-trend data generation. Machine consumable micro-trend data generation produces synchronized, structured, context-rich data that contains both summary and exceptional activity. Machine consumable micro-trend data generation reduces and refines the data to keep important summary and exceptional content and removes noise. This content enables machine learning training to choose from only the most valuable data. Machine learning training using machine consumable micro-trend data input has significantly less data to evaluate which results in fewer model iterations to differentiate important data from noise. As a result, machine consumable micro-trends deliver lower data generation and model training costs while maintaining model accuracy.

Machine learning scoring also benefits from machine consumable micro-trend data generation. Machine consumable micro-trend data generation enables a new form of scoring that can be done regularly during the higher frequency machine consumable interval. Micro-trend summary context enables scoring to better assess whether test data is normal or anomalous based on the summary and exceptional activity. Furthermore, all machine learning scoring benefits from micro-trend data generation correlations between workload component interactions and consumer to consumed resource cause and victim peers.

Smarter data generation can significantly improve machine learning training. By reconfiguring human consumable micro-trend data generation into machine consumable micro-trend data generation, machine learning training can improve model building cost and speed while maintaining model accuracy. Generating machine consumable micro-trends requires: a large number of fine-grained buckets, the top n most significant users/consumers, and more frequent data generation (e.g. less than one second).

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for diagnosing workload performance problems in computer servers, the method comprising:

measuring, continuously at a first predetermined frequency, resource metrics from a plurality of hardware components of a computer server, wherein the computer server is being used by a plurality of processes that is being executed by the computer server, the resource metrics are collected on a per hardware component basis;

updating, continuously at the first predetermined frequency, process activity metrics for the plurality of processes on a per-process basis by aggregating the resource metrics, wherein the process activity metrics for a particular process comprises an aggregation of the resource metrics associated with any hardware component used by the particular process;

generating condensed diagnostic data, at a second predetermined frequency, the second predetermined frequency being smaller than the first predetermined frequency, and wherein generating the condensed diagnostic data comprises:

identifying the most consumed hardware component based on the resource metrics collected on a per hardware component basis; and grouping the processes into buckets based on attributes of the processes and aggregating the process activity metrics of the processes in each bucket;

recording the bucket contents to facilitate identifying one or more most significant consumed resource names, corresponding consumed resource metrics; and identifying, from each bucket, a process with largest process activity metrics.

2. The computer-implemented method of claim 1, wherein measuring resource metrics, aggregating resource metrics for each hardware component, aggregating resource and non-resource lower level activity metrics for each process, and generating the condensed diagnostic data are always-on and continuously performed.

3. The computer-implemented method of claim 1, wherein one or more buckets are based on process attribute ranges related to the resource metrics where the processes belonging to each bucket are within a unique bucket range.

4. The computer-implemented method of claim 1, wherein one or more buckets are based on a standardized set of process attributes independent of the resource metrics where the processes belonging to each bucket have matching attributes.

5. The computer-implemented method of claim 1, wherein a resource metric associated with a hardware component comprises at least one from a group comprising a usage time, an access count, a response time, and a delay time.

6. The computer-implemented method of claim 1, wherein each bucket includes a count of the number of processes and the process is identified as the process associated with a resource metric from a group comprising the largest aggregate usage time, the largest aggregate access count, the largest aggregate response time, and the largest aggregate delay time.

7. The computer-implemented method of claim 1, wherein the condensed diagnostic data generated comprises:
a predetermined number of buckets.

8. The computer-implemented method of claim 7, further comprising:
determining a base-line for every resource metric;
determining base-line deviation periods by a standardized threshold for every resource metric;
identifying a peak for every base-line deviation period above the base-line and a valley for every base-line deviation period below the base-line for every metric; and
mapping interdependencies and relationships between consumed resources and processes based on workload-wide, synchronized, condensed diagnostic data by correlating peaks and valleys temporally.

9. The computer-implemented method of claim 7, further comprising:
training machine learning with the condensed diagnostic data to build a machine learning model; and
scoring the condensed diagnostic data or traditional mainline data with the machine learning model.

10. A computer program product comprising a memory device with computer executable instructions therein, the instructions when executed by a processing unit perform a method of diagnosing workload performance problems in computer servers, the method comprising:
measuring, continuously at a first predetermined frequency, resource metrics from a plurality of hardware components of a computer server, wherein the computer server is being used by a plurality of processes that is being executed by the computer server, the resource metrics are collected on a per hardware component basis;
updating, continuously at the first predetermined frequency, process activity metrics for the plurality of processes on a per-process basis by aggregating the resource metrics, wherein the process activity metrics for a particular process comprises an aggregation of the resource metrics associated with any hardware component used by the particular process;
generating condensed diagnostic data, at a second predetermined frequency, the second predetermined frequency being smaller than the first predetermined frequency, and wherein generating the condensed diagnostic data comprises:
identifying the most consumed hardware component based on the resource metrics collected on a per hardware component basis; and
grouping the processes into buckets based on attributes of the processes and aggregating the process activity metrics of the processes in each bucket;
recording the bucket contents to facilitate identifying one or more most significant consumed resource names, corresponding consumed resource metrics; and
identifying, from each bucket, a process with largest process activity metrics.

11. The computer program product of claim 10, wherein measuring resource metrics, aggregating resource metrics for each hardware component, aggregating resource and non-resource lower level activity metrics for each process, and generating the condensed diagnostic data are always-on and continuously performed.

12. The computer program product of claim 10, wherein one or more buckets are based on process attribute ranges related to the resource metrics where the processes belonging to each bucket are within a unique bucket range.

13. The computer program product of claim 10, wherein one or more buckets are based on a standardized set of process attributes independent of the resource metrics where the processes belonging to each bucket have matching attributes.

14. The computer program product of claim 10, wherein a resource metric associated with a hardware component comprises at least one from a group comprising a usage time, an access count, a response time, and a delay time.

15. The computer program product of claim 10, wherein the condensed diagnostic data generated comprises:
a predetermined number of buckets.

16. The computer program product of claim 15, wherein the method further comprises:
determining a base-line for every resource metric;
determining base-line deviation periods by a standardized threshold for every resource metric;
identifying a peak for every base-line deviation period above the base-line and a valley for every base-line deviation period below the base-line for every metric; and
mapping interdependencies and relationships between consumed resources and processes based on workload-wide, synchronized, condensed diagnostic data by correlating peaks and valleys temporally.

17. The computer program product of claim 15, wherein the method further comprises:
training machine learning with the condensed diagnostic data to build a machine learning model; and
scoring the condensed diagnostic data or traditional mainline data with the machine learning model.

18. A system comprising:
a memory; and
a processor coupled to the memory, the processor configured to perform a method for diagnosing workload performance problems in computer servers, the method comprising:
measuring, continuously at a first predetermined frequency, resource metrics from a plurality of hardware components of a computer server, wherein the computer server is being used by a plurality of processes that is being executed by the computer server, the resource metrics are collected on a per hardware component basis;

updating, continuously at the first predetermined frequency, process activity metrics for the plurality of processes on a per-process basis by aggregating the resource metrics, generating condensed diagnostic data, at a second predetermined frequency, the second predetermined frequency being smaller than the first predetermined frequency, and wherein generating the condensed diagnostic data comprises:

identifying the most consumed hardware component based on the resource metrics collected on a per hardware component basis; and grouping the processes into buckets based on attributes of the processes and aggregating the process activity metrics of the processes in each bucket;

recording the bucket contents to facilitate identifying one or more most significant consumed resource names, corresponding consumed resource metrics; and identifying, from each bucket, a process with largest process activity metrics.

\* \* \* \* \*